United States Patent
Höhse et al.

(10) Patent No.: US 12,253,461 B2
(45) Date of Patent: Mar. 18, 2025

(54) OPEN-LOOP/CLOSED-LOOP PROCESS CONTROL ON THE BASIS OF A SPECTROSCOPIC DETERMINATION OF UNDETERMINED SUBSTANCE CONCENTRATIONS

(71) Applicant: Sartorius Stedim Biotech GmbH, Göttingen (DE)

(72) Inventors: Marek Höhse, Göttingen (DE); Alexander Graf, Ulm (DE); Christian Grimm, Heiligenstadt (DE)

(73) Assignee: Sartorius Stedim Biotech GMBH, Gottingen (DE)

( * ) Notice: Subject to any disclaimer, the term of this patent is extended or adjusted under 35 U.S.C. 154(b) by 290 days.

(21) Appl. No.: 17/800,445

(22) PCT Filed: Feb. 18, 2021

(86) PCT No.: PCT/EP2021/053990
§ 371 (c)(1),
(2) Date: Aug. 17, 2022

(87) PCT Pub. No.: WO2021/204450
PCT Pub. Date: Oct. 14, 2021

(65) Prior Publication Data
US 2023/0102813 A1    Mar. 30, 2023

(30) Foreign Application Priority Data
Apr. 9, 2020   (DE) .................. 102020002256.1

(51) Int. Cl.
*G01N 21/33*   (2006.01)
*G01N 21/85*   (2006.01)

(52) U.S. Cl.
CPC ............. *G01N 21/33* (2013.01); *G01N 21/85* (2013.01)

(58) Field of Classification Search
CPC ........ G01N 21/33; G01N 21/85; G01N 21/65; G01N 21/31
See application file for complete search history.

(56) References Cited

U.S. PATENT DOCUMENTS

2010/0045969 A1* 2/2010 Busch .................... G01N 21/65
                                                              324/309
2010/0131247 A1* 5/2010 Carpenter ................ F17D 5/00
                                                              703/2

(Continued)

FOREIGN PATENT DOCUMENTS

DE    202008003790 U1   5/2008

OTHER PUBLICATIONS

Rios-Reina, R. et al., "Application of hierarchical classification models and reliability estimation by bootstrapping, for authentication and discrimination of wine vinegars by UV-vis spectroscopy", Chemometrics and Intelligent Laboratory Systems, vol. 191, Aug. 2019, Elsevier Science Publishers B.V., Amsterdam, NL.

(Continued)

Primary Examiner — Dani Fox
Assistant Examiner — Casey Bryant
(74) Attorney, Agent, or Firm — Quinn IP Law

(57) ABSTRACT

Method for open-loop or closed-loop control of a process, in particular a downstream bioprocess, based on the projection of an unknown concentration of at least one substance in a sample using spectroscopy, in particular UV/vis spectroscopy, comprising the steps: Detect spectrums of a plurality of concentration samples, wherein at least two concentration samples have differing concentrations of the substance; generate several quantitative models based on the spectrums of the concentration samples, wherein the models each have a mapping of at least one spectral measurand of the spectrums to concentrations in concentration ranges, wherein the concentration ranges of two models are not identical; detect (Continued)

at least one sample spectrum of the sample; map the sample spectrum to at least one quantitative model of the generated quantitative models; apply the at least one quantitative model that was mapped to the sample spectrum against the sample spectrum to determine a projected value for the unknown concentration; and apply open-loop and/or closed-loop control of the process for at least one parameter based on the projected value for the undetermined concentration.

19 Claims, 6 Drawing Sheets

(56) References Cited

U.S. PATENT DOCUMENTS

| | | | |
|---|---|---|---|
| 2014/0185033 A1* | 7/2014 | Moretto | G01N 21/65 356/51 |
| 2018/0172592 A1* | 6/2018 | Perez Pellitero | B01D 15/1821 |
| 2019/0272894 A1* | 9/2019 | Wasalathanthri | G01N 30/86 |

OTHER PUBLICATIONS

Eriksson, V.L. et al., "3 PCA", Multi- and Megavariate Data Analysis—Basic principles and Applications: Part 1, Umetrics, Dec. 31, 2013, pp. 39-62.

International Search Report for International Application No. PCT/EP2021/053990, Issued Apr. 22, 2021.

* cited by examiner

OPEN-LOOP/CLOSED-LOOP PROCESS CONTROL ON THE BASIS OF A SPECTROSCOPIC DETERMINATION OF UNDETERMINED SUBSTANCE CONCENTRATIONS

TECHNICAL FIELD

The present invention relates to a method, to a device, and to a computer program product for determining an undetermined concentration of at least one substance, in particular a biological substance, such as a protein or a DNA in a sample using spectroscopy, in particular using UV/vis spectroscopy, or using infrared, Raman, and/or fluorescence spectroscopy.

The invention can preferably be realized in the broad bioprocessing industry, including in environmental, agricultural and food processing, biofuels, and pharmaceutical applications.

BACKGROUND

In cleaning steps, in particular in downstream processes that are generally used to segregate and clean fermentation products from a fermentation broth of a biotechnology process, concentrations of substances, in particular protein and DNA concentrations, represent important parameters or variables that need to be tracked and repeatedly determined along the entire process chain. This determination is typically performed off-line, in particular as random samples outside of the container in which a fermentation broth undergoes chemical and/or biochemical processes, and not in real time. A fermentation broth can for example be defined as a biotechnological medium, in particular as a product that can be a medium having at least one protein and/or one vaccine and/or one hormone.

Concentrations of substances are typically determined or measured using optical spectroscopy, in particular using UV/vis absorption spectroscopy. For this purpose, the molecules of the substance of a sample of the fermentation broth are generally excited with individual discrete wavelengths that are in particular substantially predetermined and that correspond to excitation wavelengths or excitation frequencies, and the absorbance or extinction, or alternatively the intensity, is determined at these substantially discrete excitation wavelengths in order to determine the concentration. Narrowband sensors are for example frequently used for this purpose. But the latter do not necessarily have to be narrowband sensors. The excitation for sensors is typically substantially narrow-banded, whereas the wavelength can be detected or recorded at a relatively wide range. In other words, only the narrowband light is used for excitation on the one hand, whereas the measured or measurable wavelength range can be relatively wide. Spectrometers with such sensors frequently use a dispersive element, such as a lattice, a prism, etc.

By contrast, spectrometers that are designed to record spectral information generally use broadband emitting light sources (also called broadband light sources) and matching broadband detecting sensors (also called broadband sensors). A broadband light source can for example be a deuterium light source or a halogen light source.

The substance concentration—in particular the protein concentration—can differ significantly in various stages of the cleaning process or in different process steps. The values for substance concentrations can for example vary between approximately 0 and approximately 200 g/L. The hardware, for example the measurement cell or the sensor, is not suited for all partial ranges of the achieved concentrations. For example, the limited dynamic range of the detectors on many available online sensors only permit detecting substance concentrations up to approximately 10 g/L. Additionally, the optical path or path length needs to be adjusted depending on the concentration range in order to shift the detection range as needed or to have the ability to also measure other substance concentrations. As a result, not one and the same hardware unit—in particular not the same measurement cell—may be usable for all applications, in particular for all cleaning steps.

Moreover, UV sensors frequently exhibit a significant undesirable cross-sensitivity between DNA and protein. This is for example the case when an increase of the DNA concentration results in a higher apparent protein concentration measurement. It can for example be the case that an absorption band for DNA overlaps with an absorption band for a protein. Because the bands do not exist in isolation and cannot be separately and independently recorded with sensors, the problem frequently presents itself as being able to unambiguously differentiate and identify what substances (the protein or the DNA in this case) changed to what extent with respect to the concentration.

There are online UV sensors that work with 1 or 2 individual wavelength ranges (Optek, Pendotech), which are however saturated at already relatively low protein concentrations. By contrast, broadband sensors are frequently used in spectrometers that are designed to record relatively broad spectral information. Accordingly, a UV-Vis spectrum can—in addition to the information of typical UV sensors—exhibit a plurality of further excitation wavelengths or frequencies. In other words, a spectrum emitted by a light source can certainly be wider or more extensive than the part measured or detected by the sensor. This is determined by the choice of sensors and light source(s). Such UV/vis spectrometers can accordingly comprise one or two (in certain situations also several) light sources that accordingly generate one or two excitation wavelengths. According to the fact that for example two narrowband emitting light sources can be used, corresponding sensors can each be designed to detect electromagnetic radiation in the wavelength range of interest. UV sensors can then detect a limited number of narrowband excitation wavelengths, in particular one or two that each comprise approximately 10 nm in the wavelength width. The central wavelengths, that is to say the wavelengths that include the maximum, can for example be at 250 nm and/or approximately 280 nm.

It can under certain circumstances be the case that the wanted signal runs into saturation. One problem created by saturation is the absorbance behavior at a defined wavelength and at a fixed optical path length. This relationship is based on the Lambert-Beer law:

$$A = -lg\left(\frac{I}{I_0}\right) = \varepsilon_\lambda \cdot c \cdot d$$

where A corresponds to the absorbance, $I_0$ corresponds to the intensity of the incident light, I corresponds to the intensity of the light that passes the sample, $\varepsilon_\lambda$ corresponds to the decadic extinction coefficient at wavelength $\lambda$, c corresponds to the substance quantity concentration of the absorbing substance, and d corresponds to the layer thickness of the sample or the path length of the light through the sample.

The problem of saturation occurs in particular at high absorbencies A because the intensity I on the measurement channel becomes extremely small at high concentrations c, and can then potentially no longer be differentiated from the detector noise. At high concentrations c, the intensity/therefore approaches zero, and A becomes large as a result, and the behavior of the wanted signal A exhibits a non-linear saturation graph due to the signal-to-noise ratio (SNR) of the detector.

Moreover, different substances, in particular different proteins, can have absorption bands that each have a maximum substantially centered about different excitation wavelengths. In other words, the central wavelength of an absorption band or an absorption maximum can vary for different proteins. Commercially available UV/vis spectrometers generally do not adjust the excitation and/or detection wavelength to the substances currently under test, in particular to the protein currently under test. It is then a matter of chance whether a protein is randomly measured at the maximum or near the maximum of the absorption wavelength, or whether the molecules of a protein are excited with the excitation wavelength about which the absorption band of the protein is centered or has a maximum at this excitation wavelength. However, it is highly likely that the previously determined excitation wavelength is located beyond the wavelength range at which the absorption band has an absorption maximum. For example, the previously determined excitation wavelength can overlap with the flank area of an absorption band.

The maximum is decisive or relevant in particular when the object is to tend toward lower concentrations (smaller LODs). However, a better dynamic behavior is typically present on the flank.

A flank range—or a wavelength range for which the absorption flattens to higher or lower wavelengths about the absorption maximum—typically has a reduced sensitivity to changes in the concentration. The metric for cross sensitivity also in particular depends on the wavelength-dependent extinction coefficient $\varepsilon_\lambda$ of the target protein and the contaminants (HCPs) and their concentration ratios. For this reason, absorption values of host cell proteins (HCPs) are frequently recorded together with those for target proteins (cross sensitivity is nearly 100%), and isolating the respective contributions of both absorption values for analyzing the respective concentration of both substances is essentially impossible.

An approach having the effect that a wide range of various concentrations can be measured by UV/vis spectroscopy comprises a reversible change of the optical path length using a measurement cell that contains the sample. This is accomplished by giving a fiber a movable design for the transmission measurement of UV/vis spectrums such that the optical path length can be reproducibly varied (FlowVPE). As a result, an optical path length can also have far smaller values than the minimum path length of approximately 1 mm typical for UV sensors. This approach also permits recording substance concentrations, in particular protein concentrations, above 100 g/L. This approach has the effect that the device must have movable parts, and that the spacing between the fibers must be accurately and reproducibly adjustable. But smaller path lengths have the disadvantage that high concentrations typically go hand-in-hand with dynamic viscosities, which under certain circumstances can represent a disadvantage for the fluidics (including pressure drops, shear currents, etc.).

SUMMARY

According to an aspect, the task is to provide a method, a device, and a computer program product for determining and undetermined concentration of at least one substance in a sample over a wide concentration range.

The task is solved by the subject matter of the respective main claims.

Preferred embodiments are the subject matter of dependent claims.

The present invention is based on generating quantitative models, in particular based on multivariate data analysis. Key concepts of multivariate data analysis, such as PLS, OPLS, multivariate calibration, multivariate process modeling, hierarchical modeling, etc. are described in detail in the subject matter volume "Multi- and Megavariate Data Analysis—Basic principles and Applications" ($3^{rd}$ Edition) by L. Eriksson et al.

Even if not explicitly mentioned, the following aspects can be combined with each other in various embodiments, provided they do not logically rule each other out.

According to an aspect, a method for open-loop or closed-loop process control, in particular a downstream bioprocess, based on the projection of an unknown or undetermined concentration of at least one substance in a sample or in a medium using spectroscopy, in particular using UV/vis spectroscopy, comprises the steps:

Detect spectrums, in particular optical spectrums, preferably of absorption spectrums and/or excitation spectrums of a plurality of concentration samples, wherein at least two concentration samples have different concentrations of the substance in relation to each other;

Generate several quantitative models based on the spectrums of the concentration samples, wherein the models each comprise a mapping and/or application of at least one spectral measurand of the spectrums to concentrations in concentration ranges, wherein the spectral measurand in particular comprises an absorbance and/or an intensity of the spectrums, and wherein the concentration ranges of two models are not identical, and two concentration ranges in particular overlap or lie next to each other;

Detect at least one sample spectrum of the sample or the medium;

Map the sample spectrum to at least one quantitative model of the generated quantitative models;

Apply the at least one quantitative model that was mapped to the sample spectrum against the sample spectrum to determine a projected value for the undetermined concentration; and Operate the process by open-loop and/or closed-loop control for at least one parameter based on the projected value for the undetermined concentration.

An undetermined concentration in the present case in particular relates to an unknown concentration or to a concentration not yet determined by means of reference analytics. The projection using the method in particular achieves a determination of the concentration.

Other than with conventional methods that strictly record absorption values for discrete wavelengths, based on this aspect, a whole series or a set of absorption values can be recorded for a wavelength range. In particular, entire spectrums, in particular absorption or intensity spectrums of dilution samples of a dilution series and a sample, are recorded and detected. In other word, spectrums, for example an absorption spectrum instead of individual values such as absorbance for an excitation wavelength, are recorded.

Yet another advantage is that a single measurement cell with a constant optical path length can be used for the measurements. A flow cell with constant optical path length is particularly suited. Particular preference in this case is given to a flow cell that has a sample layer thickness or an optical path length or a width of the interior space between approximately 10 μm and approximately 10 cm, in particular between approximately 15 μm and approximately 5 mm, and particularly preferably between approximately 50 μm and approximately 3 mm. A particularly preferred sample layer thickness is at approximately 1 mm. This has the advantage that one or several samples can be examined several times or repeatedly using one and the same measurement cell.

Depending on what process is to be monitored, the method can be adapted for the respective medium under test, comprising the substance in question. The method can in particular be used to monitor a downstream process. Alternatively or additionally, the method can also be used to monitor a fermentation and/or an upstream process.

For a fermentation—which can be part of an upstream process—it is for example expedient to monitor the fermentation broth within a bioreactor. For a downstream process, it is for example expedient to monitor the medium to be separated and/or to be cleaned, for example the fermented broth with the target protein and/or the target DNA in a cleaning step, for example upstream, on, in, and/or downstream of a filtration system and/or a dialysis unit.

The method can for example particularly advantageously be performed to analyze a medium, in particular a fluidic medium in an SU bioreactor, if a process in the bioreactor is to be monitored. Such an SU bioreactor—which can for example comprise an SU bag and/or another SU container and/or a hose with in-line flow measurement cell, preferably an SU flow cell—in particular contains a fermentation broth that undergoes chemical and/or biological and/or biochemical processes. The fermentation broth is subsequently monitored downstream, preferably during cleaning. In order to monitor the activities or processes within the container, the contents are analyzed chronologically recurringly and/or permanently over time.

A container can for this purpose for example be equipped with a sensor. Alternatively or additionally, a container can be equipped with a bypass line or a sampling line, and a flow cell. Alternatively or additionally, a wall protrusion with measurement range can be arranged or provided on the container. Directly or indirectly on the flow cell and/or on the wall protrusion, a spectrometer can be arranged that is designed to repeatedly or continuously and/or permanently record data, in particular absorption measurands. Spectrums can then be recorded over an extended time frame, for example over several hours, to monitor the processes over these time frames. For example, the concentration of a protein and/or of a DNA can then be tracked and/or monitored.

The following downstream steps can for example occur in a system for product cleaning, in particular for protein cleaning:
1. Cell-segregation (Clarification)
2. Product capture (bind & elute)
3. Polishing steps (cation and/or anion exchange chromatography and/or size exclusion chromatography)
4. Concentration steps and/or buffer exchanges, such as ultrafiltration and/or diafiltration in a crossflow setup.
5. Virus reduction with a filtration step and/or virus inactivation, for example by pH shift or UV-C treatment, . . . .
6. Sterile filtration
7. Filling processes (incl. freeze and thaw)

Yet another advantage of this aspect is that various substances or materials can be analyzed in isolation from each other, provided their bands do not have their local absorption or intensity maximum at identical wavelengths. When for example the absorption maximum of a host cell protein (HCP) differs in its excitation wavelength and/or in its form from the target protein, an analytical differentiation can be possible by recording an entire spectrum. However, the differentiation substantially also relies on the absorption spectrum in comparison to the spectrum of the target analyte, which in particular includes the width of the peak, and the maximum and the shape of the peak. Any overlap of several protein peaks of the HCP's can then result in a structure in the area of the protein absorption that does not necessarily correspond to a Gaussian absorption band. So-called cross sensitivities of the measurement method can then be suppressed and/or bypassed. This permits effective quality control of the medium and allows determining with the greatest possible precision what ratios of for example HCP and/or target proteins are present in the medium. Based thereon, estimates can be made as to whether further cleaning steps are necessary.

In other words, the cited aspect in particular permits measurements of substantially continuous absorption spectrums or absorption spectrums comprising discrete measurement points, instead of measurements of merely individual absorption values at substantially singular wavelengths or a measurement of individual absorption values at relatively narrow wavelength ranges. For example, a continuous absorption spectrum between a wavelength range of approximately 280 nm and approximately 750 nm can be recorded, whereas a known conventional method for example permits a measurement between approximately 310 nm and 320 nm. The full width at half maximum (FWHM) on LEDs can be relatively narrow-banded, and can for example be approximately 10 nm. Absorption spectroscopy, in particular UV absorption spectroscopy and the corresponding sensors, are preferably based on a comparatively broadbanded excitation or on a spectrum emitted and correspondingly detected at a broad band. Light sources can for example be a deuterium lamp and/or a xenon lamp and/or one or several LEDs.

The invention is based on the Lambert-Beer law. The invention in particular avoids that the path length must be varied for a fixed wavelength (or for a limited number of wavelengths pre-selectable with the light source or detector/filter). The invention instead permits recording the entire spectrum, and therefore permits selecting the effective ε for a fixed or unchangeable path length d. This is accomplished by selecting—either explicitly or by multivariate algorithm—the wavelength λ to be used.

The cited aspect in particular permits monitoring the system by using a single flow cell with a constant optical path length. Depending on the concentration range to be measured, various multivariate models (such as PLS with substance concentration, in particular protein concentration as a target parameter, and the absorption values of the respective spectral range as input parameters) are prepared that are based on analyzing various wavelength ranges. These are either user-selectable or can be selected and/or can be assigned different weight factors by an algorithm (e.g. with PLS/Partial Least Square or MLR/Multiple Linear Regression), wherein the selected wavelength ranges are influenced by the absorbance of the target analyte (e.g. DNA or protein) or changes in the matrix. In particular, at least two nonidentical partial ranges, in particular excitation wavelengths of a range, are selected based on the criterion whether the maximum intensity of the absorption band still lies within the usable dynamic range of the detector.

In particular, the individual wavelength ranges for the absorption values selected for the models have different sensitivities with regard to the detection of the substance concentration. The dynamic range then differs by model. The same applies analogously for the attainable analytical accuracy of the measurement.

The spectrums preferably comprise absorption spectrums and/or intensity spectrums, wherein the absorption spectrums and/or intensity spectrums [ . . . ] a unique mapping, in particular a unique assignment, of the spectral measurand, for example of the absorption value and/or the intensity value, to several wavelengths, wherein at least one subset of the absorption values or intensity values that are mapped to the corresponding wavelengths preferably does not exhibit a detector-side saturation. The spectral measurand can in particular be the absorption value or the intensity value.

A detector side saturation occurs when a concentration dependent change of the detector signal no longer occurs at a certain wavelength or a wavelength range.

In particular, a separate weight or weight factor can also be assigned to each wavelength. In this case, it is generally not formally necessary to select wavelengths. A weight factor near 0 essentially has the same effect.

A detector signal can enter a saturation range when the intensity or absorbance of the electromagnetic radiation is too high at a certain wavelength or in a wavelength range, such that the corresponding value is outside of the dynamic range of the detector. In other words, a saturation can occur in both directions of the "detector filling", that is to say with respect to an overflow or an underflow.

During UV spectroscopy, the probe—if saturated—in particular absorbs excessive light such that the light arriving at the detector can no longer be differentiated from the dark noise of the detector.

If a saturation is reached, the detector cannot supply a resolution of the intensity or the absorbance within the saturated range. This can for example be the case when a sample exhibits a very high concentration and/or a high optical path length is caused by a very thick measurement cell such that the absolute quantity of molecules that interact with the light or the electromagnetic radiation is particularly high. In order to determine the dependency of an absorbance and/or intensity, it is advantageous when the wavelength range under test exhibits substantially no saturation for all concentrations under test such that the differences in absorbance and/or intensity can be resolved and/or the dependency of the concentration of a concentration series can be rendered as needed. If saturation occurs in a wavelength range, the detector is blind for the actual spectral measurand, that is to say the absorbance and/or intensity.

The quantitative models preferably comprise at least one global model, comprising several sub-models that do not overlap each other.

A global model can for example have values from approximately 0 g to approximately 150 g. Possible local models [can] have values from approximately 2 g to approximately 10 g, from approximately 10 g to approximately 50 g, and from approximately 30 g to approximately 80 g. A sub-model must not necessarily have a common limit value with the global model. Although limit values can be identical, this case is an exception.

A global model gives a process unit the ability to estimate a rough dependency between the spectral measurand of a spectrum and various concentration ranges. The submodels can substantially comprise relatively coarsely staggered concentration ranges that are broken down into increasingly smaller ranges. The submodels of a global model can for example be staggered into a first range from approximately 0 g/L to approximately 5 g/L, into a second range from approximately 0 g/L to approximately 25 g/L, and into a third range from approximately 0 g/L to approximately 75 g/L.

However, the submodels do not necessarily have to start at 0. This can potentially even be disadvantageous because the model range would in this case have to be kept unnecessarily wide. When the process step for example contains concentrations from approximately 50 to approximately 75 g, an optimized model will contain a slightly larger range (such as 45-80 g/L).

The quantitative models preferably each comprise at least one individually selected submodel.

A submodel can comprise an arbitrary concentration range. Several submodels can in particular be generated with respectively different concentration ranges. At least two concentration ranges can in this case substantially overlap, substantially adjoin, and/or be at a distance from each other. A submodel can in particular be a true subset (e.g. with restricted y range) of the higher level model spectrum set.

The quantitative models preferably comprise models organized hierarchically according to at least a first hierarchy level and a second hierarchy level, wherein in particular the first hierarchy level comprises a global model and the second hierarchy level comprises a local model.

In a first hierarchy level, a global model gives the process unit and/or the user the ability to—for example automatically or by automated means—recognize and/or estimate a rough dependency between the spectral measurand of a spectrum and various concentration ranges. The submodels can substantially comprise relatively coarsely staggered concentration ranges that are broken down into increasingly smaller ranges. The submodels of a global model can for example be staggered into a first range between approximately 0 g/L and 5 g/L, into a second range between approximately 0 g/L and 25 g/L, and into a third range between approximately 0 g/L and 75 g/L.

In a second hierarchy level, a local model gives the process unit and/or the user the ability to—in particular automatically or by automated means—recognize and/or estimate a higher resolution dependency between the spectral measurand of a spectrum and various concentration ranges. The submodels can substantially comprise concentration ranges with relatively fine staggers. The submodels of a local model can for example be staggered into a first range between approximately 0 g/L and 5 g/L, into a second range between approximately 5 g/L and 25 g/L, and into a third range between approximately 25 g/L and 75 g/L. In this respect, the concentration ranges of a local model substantially adjoin each other.

The mapping of the sample spectrum to at least one quantitative submodel preferably comprises an estimate based on determined, and in particular based on indicated data, in particular based on indicated spectrums.

A fast, uncomplicated estimate, for example "by rule of thumb" and/or based on a rough approximation can supply a first approximate result that can then be verified and/or validated, for example using FIT.

The estimate by the user occurs in particular solely when selecting the submodels. Based on an example, the user can then pick the model 0-50 g/L because a concentration of approximately 40 g/L is expected at the time of measurement. Alternatively, a classification can be made using PLS-DA or SIMCA, or Euclidean distances or the Mahalanobis distance between model and current spectrums can be determined. Based on various concentration ranges, the above determines what model is a best match for the current spectrum.

The sample spectrum is preferably mapped to at least one quantitative model (M) using the Euclidean distance and/or Mahalanobis and/or PLS-DA and/or SIMCA.

Mapping the sample spectrum to at least one quantitative model using the Euclidean distance and/or Mahalanobis and/or PLS-DA and/or SIMCA has the advantage that accurate projections can be made for the concentration of a substance in a medium or in a sample. [Accuracies of the concentration projection achieved] When in use, certain processes can exhibit a very wide range of protein concentrations, which preferably need to be covered. For any specific case, it is possible that the model ranges are too small, requiring a switchover between the models during the process.

The accuracy of the projection in particular depends on the range of the model. For any specific case, it is possible that this range is too narrow in relation to the error of the reference; as a result, an algorithm cannot determine what wavelengths are needed to determine the analyte concentration. For any specific case, it is also possible that the range is too wide; as a result [ . . . ], which may potentially cause a gap in the projection.

Open-loop and/or closed-loop control preferably occurs for the at least one parameter, and the parameter preferably comprises at least one of the following parameters: a valve circuit, a pump controller, a media flow, a media pressure, a gas pressure, a pH value, a filtration step, a fractioning step, a time controller, a process time setting, a temperature, an ion concentration, a chromatography step.

The process controller to which the projected value is forwarded can exert influence on the process in the desired degree on the basis of the determined projected value. The process can then be efficiently controlled by open-loop and/or closed-loop control based on a determined projected value. The feedback can in particular be intended to render the process more efficient and/or to obtain the product or the substance particularly carefully and/or to protect the product or substance from potential denaturing and/or damage due to undesired process parameter values. The process parameters that can for example be influenced can comprise the aforementioned ones: a valve circuit, a volumetric flow pressure, a gas pressure, a pH value, a filtration step, a fractioning step, a time controller, a process time setting, a temperature, an ion concentration or a salt concentration, or a titer, a gradient, a chromatography step.

The at least one sample spectrum of the sample is preferably recorded online or in real time, in particular during a, or during the, process, and the open-loop and/or closed-loop control is preferably also performed during the process as a direct consequence of the determined projected value for the undetermined concentration.

Real-time monitoring gives the process unit and/or the user and/or an automated apparatus the ability to immediately intervene into the process parameters based on the determined projected value or based on the determined concentration of the substance in question. Immediately intervening into the process in particular permits open-loop and/or closed-loop control of the process. In other words, feedback can occur such that at least one process parameter is monitored and/or controlled by open loop and/or controlled by closed loop based on the determined concentration value of at least one substance. In any given case, this avoids that a sample of the medium must be taken and measured ex situ. The sample or the medium [ . . . ] in situ, in particular during the process inside a system, for example inside a fermentation container and/or inside a downstream system, for example upstream and/or downstream of a chromatography.

Quantitative models are preferably generated using multivariate model generation, in particular using a multivariate regression method, preferably such as multiple linear regression (MLR), and/or partial least squares (PLS) and/or orthogonal partial least squares (OPLS).

A multivariate regression method permits highly accurate models to be efficiently determined or generated by automated means. Parameters that specify desired conditions for automation, such as maximum and/or minimum values for process parameters, can be specified by the process unit and/or the user. The process can then be monitored in real time automatically or by automated means even when the user is absent.

In particular, at least one partial range, in particular individual wavelengths of the spectrums of the plurality of the concentration samples, is weakened or ruled out by applying a weight factor.

For example, at least one partial range, in particular individual wavelengths of the spectrums of the plurality of the concentration samples, and preferably partial ranges for which a saturation of the spectrums occurs, are weakened and in particular ruled out for application on the sample spectrum by applying a weight factor.

By applying a weight factor, for example a factor (in this example, factors are referenced against 1) significantly less than 1, for example for values less than approximately 0.1, in particular less than approximately 0.05, and preferably less than approximately 0.01, it can be ruled out that undesirable data, for example absorption values for which a saturation occurs, are automatically but undesirably incorporated into generating a model and/or determining the concentration of a substance. This can also be the case for concentration ranges for which an absorbance at a wavelength exhibits a dependency on the concentration that deviates significantly from a linear concentration. Likewise, concentration ranges and/or wavelengths can be affected for which the absorbance exhibits a particularly low sensitivity to concentration changes. A weight factor can for example be applied automatically based on specified criteria and/or can be specified by the process unit and/or the user. Models are particularly preferably generated by taking into account, or giving preference to, a linear dependency of the absorbance to the concentration of a concentration series since the projection and/or determination and/or estimate of the concentration can then be made with particular accuracy.

A higher weight factor for application on the sample spectrum is preferably assigned to at least one partial range, in particular individual wavelengths of the spectrum of the plurality of concentration samples, preferably to partial ranges that exhibit a linear dependency between wavelengths and measurands, wherein the weight factor is applied manually or by an algorithm, in particular factor analysis, factor loading or PLS loading, PLS and/or OPLS regression.

Models are particularly preferably generated by applying a higher weight factor on areas that exhibit—at least approximately—a linear dependency between absorbance and the concentration of a concentration series. The projection based on a linear dependency of the concentration can be particularly accurate.

A plurality of sample measurands are preferably detected with a single, substantially identical, gap width of one or several measuring cell(s).

Incorporating a single measuring cell allows the process unit and/or the user to determine the concentration particularly efficiently since the exchange of hardware, in particular measuring cells, can then be reduced or potentially completely avoided. The measuring conditions are then constant, and variations of measurement configurations and the resulting erroneous settings are avoided. For example, the reversible adjustment of a measuring cell to a certain layer thickness can be subject to errors. Moreover, an additional method step or several additional method steps—such as adjusting the layer thickness—is/are avoided, thus making the method particularly efficient.

According to an aspect, a device for open-loop or closed-loop process control, in particular a downstream bioprocess, based on the projection of an undetermined concentration of at least one substance in a sample or in a medium using spectroscopy, in particular using UV/vis spectroscopy, comprises the following:

At least one interface for receiving spectrums of a plurality of concentration samples of the at least one substance and of at least one sample spectrum of the sample or the medium;

At least one unit for

Generating quantitative models based on the spectrums of the concentration samples, Mapping the sample spectrum to at least one quantitative model of the generated quantitative models; and Applying the at least one quantitative model that was mapped to the sample spectrum against the sample spectrum to determine a projected value for the undetermined concentration;

At least one process unit to operate the process by open-loop and/or closed-loop control for at least one parameter based on the projected value for the undetermined concentration.

The device preferably comprises a spectrometer for recording the spectrums of the plurality of concentration samples of the at least one substance and/or the at least one sample spectrum of the sample.

According to an aspect, a computer program product comprises computer-readable commands that rely on a suitable computer-based system to cause the program when the latter is executed to execute the steps of the method according to the above aspect or any of the embodiments.

All optional and preferred features of the aspects, examples, and embodiments of the method can be accordingly combinable with the device and/or the computer program product. This results in the corresponding advantages and technical effects cited herein.

The invention can in particular be realized with Single-Use (SU) systems, for example comprising SU downstream elements, SU fermentation containers, SU bags, SU containers with respectively one wall protrusion, comprising a gap and a window through which the contents of the container can be analyzed spectroscopically in situ, that is to say in real time in the container. Tube lines with SU in-line flow cell can preferably also be used, wherein the latter can also be combined with, or directly connected to, SU containers.

The following is a detailed description of several exemplary embodiments, wherein the invention is not limited to the described exemplary embodiments.

Several features that are described in a specific embodiment can be arbitrarily combined, provided they do not rule each other out. Moreover, various features that are provided together in the exemplary embodiments are not to be regarded as restricting the invention.

DETAILED DESCRIPTION

Figure 1:
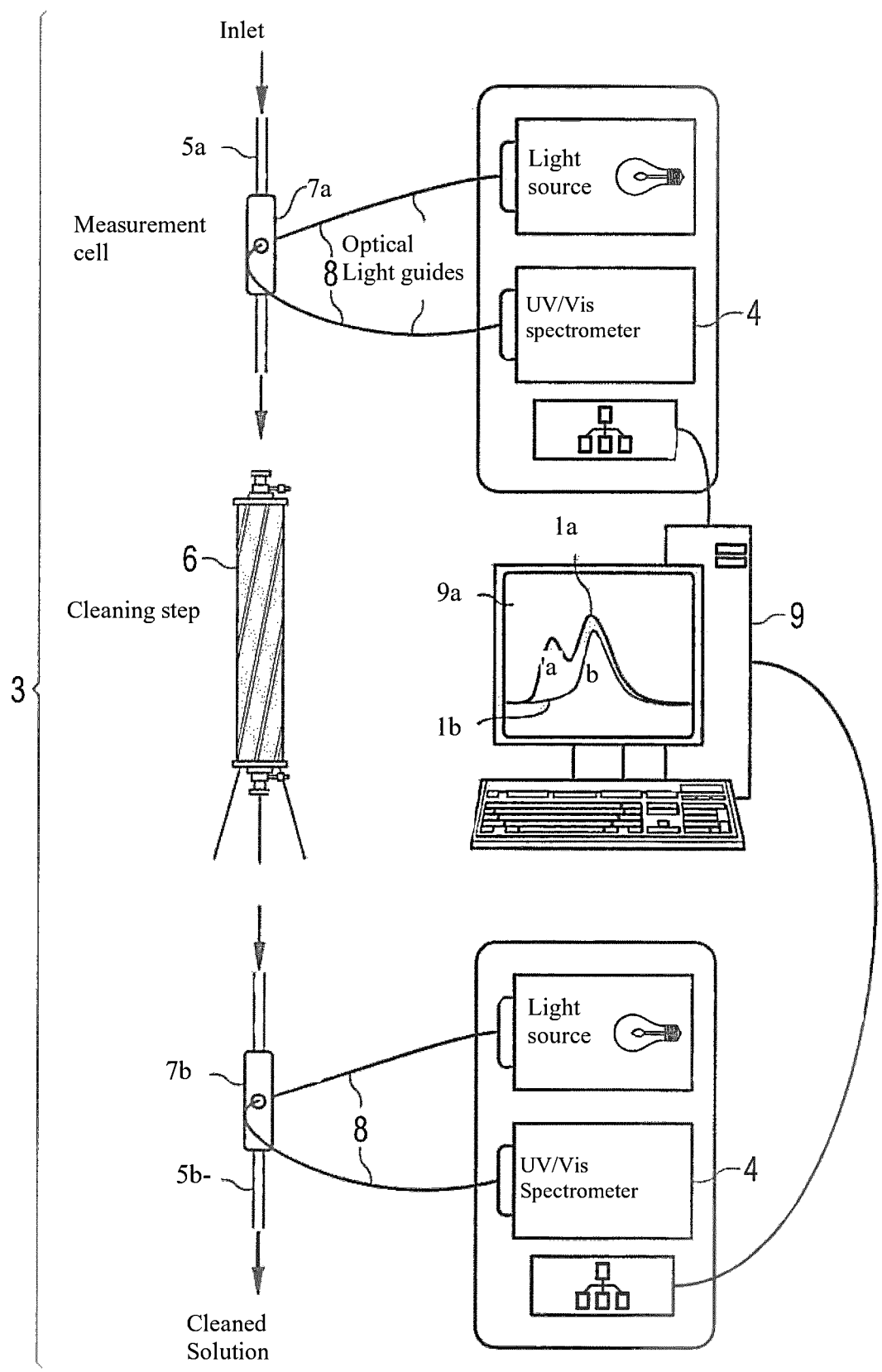
FIG. 1 is a schematic representation of an exemplary process monitoring unit for a downstream process.

FIG. 1 is a schematic representation of an exemplary process monitoring unit for a downstream process 3. The process monitoring is in this example realized using a UV/vis spectrometer 4. The two UV/vis spectrometers 4 shown in FIG. 1 can also be only a single UV/vis spectrometer 4. The at least one UV/vis spectrometer 4 is connected or coupled to an analysis unit. In the present case, the analysis unit 9 comprises a computer with a desktop or an output unit or a display 9a, on which the measured spectrum 1a, 1b can be displayed or rendered. The analysis unit 9 can comprise an interface for receiving spectrums, such as an interface for connecting a data cable. Additionally or alternatively, the UV/vis spectrometer 4 can also comprise an interface for receiving spectrums such that the data can for example be obtained from a device and/or an analysis unit 9 and/or data media.

A medium 5a to be cleaned can travel through a first cell 7a before it passes or travels through the cleaning unit 6. The first measurement cell 7a allows the process unit and/or the user to record a first spectrum 5a of the medium. The first measurement cell 7a in particular comprises a flow cell. The medium 5a can in this step in particular comprise one or several substances to be monitored. Moreover, the medium 5a can in particular comprise contaminants or substances to be separated from the medium 5a. The medium 5a can for example comprise HCPs to be disconnected or separated or isolated from the medium 5a. The display 9a in FIG. 1 shows an example of a spectrum 1a in particular an absorption spectrum of the medium 5a to be cleaned, which has two bands a, b. The first band a can for example be caused by the contaminant, and the second band b can for example be caused by the target substance, such as the target protein. Alternatively to the first measurement cell 7a, the medium 5a to be cleaned can also be examined within a container. A spectrum 1a of the medium 5a to be cleaned can for example be at least partially recorded or measured or detected within a fermentation container.

Downstream of the first measurement cell 7, the medium 5a passes through a cleaning unit 6. The cleaning unit 6 can for example enable the following methods for cleaning or separation: Filtration, chromatography, in particular column chromatography and/or high-performance fluid chromatography, electrophoreses, extraction, precipitation, sedimentation, centrifuging and/or dialysis etc. The cleaning unit 6 is in particular designed to isolate or separate the medium 5a from contaminants and/or undesired substances such that the medium 5b—after passing through the cleaning unit 6—substantially no longer comprises at least the undesired substance, such as HPCs. The substantially cleaned medium 5b instead only comprises desired substances, such as target molecules, in particular target proteins and/or salts, in particular buffer substances.

After the cleaning step, the at least partially cleaned medium 5b exits the cleaning unit 6 and passes or travels through a further measurement cell 7b. This can alternatively also be the first measurement cell 7a, and this can in particular be the first cleaned measurement cell 7a, however, it is preferred that the cleaned medium 5b passes through a non-identical further or second measurement cell 7b because it could potentially be contaminated in the first measurement cell 7a with the contaminants. However, the second measurement cell 7b can be a model identical to the first measurement cell 7a.

When the medium in particular flows through the second measurement cell 7b, or is at least partially located therein, a further spectrum 1b can be recorded by the UV/vis spectrometer 4. The display 9a in FIG. 1 shows an example of a spectrum 1b, in particular an absorption spectrum of the at least partially cleaned medium 5b, which substantially now only exhibits the band b. The first band a, which was still visible in the first spectrum 1a and which was for example caused by the contaminant, is at least no longer visible in the displayed spectrum 1b of the cleaned medium 5b. The second band b, which is for example caused by the target substance, such as the target protein, is however still visible. This indicates that the substance generating the first band a was largely separated from the medium 5b in the cleaning unit 6.

Two optical light conductors 8 are arranged on and/or in each of the measurement cells 7a, 7b. An electromagnetic radiation can in this case be coupled into one of the two optical light conductors 8, for example from the side of the UV/vis spectrometer, which exits from the optical light conductor 8 on the side of the measurement cell 7a, 7b and at least partially passes through the measurement cell 7a, 7b such that an optical light conductor 8 can at least partially detect the transmitted electromagnetic radiation on the opposite side of the respective measurement cell 7a, 7b, and can then at least partially transmit or route the transmitted electromagnetic radiation to the UV/vis spectrometer 4.

The process monitoring can alternatively also occur on and/or in a container. For example, at least one optical light conductor can be routed on and/or in a fermentation container such that the latter can use coupled-in light to excite the medium in the fermentation container, and/or can collect the light that at least passed or traveled through and potentially excited at least a part of the medium, or route said light to a detector or to a sensor. The monitoring can on the one hand at least partially occur in situ and/or ex situ. In other words, elements potentially required for monitoring, such as sensors and/or light conductors can protrude into the interior space of the fermentation container, and can in particular be in direct physical contact to the medium, in particular the fermentation broth (in situ), and/or can be arranged from the exterior, for example on a window with optical access to the interior space such that direct physical contact to the medium can be avoided (ex situ).

The measurement cells 7a, 7b in particular have a substantially constant optical path length or thickness. The optical path length of the light or the thickness of the measurement cell 7a, 7b can be between approximately 100 nm and approximately 10 cm, in particular between approximately 500 nm and approximately 5 mm, and particularly preferably between approximately 800 nm and approximately 3 mm.

Figure 2:
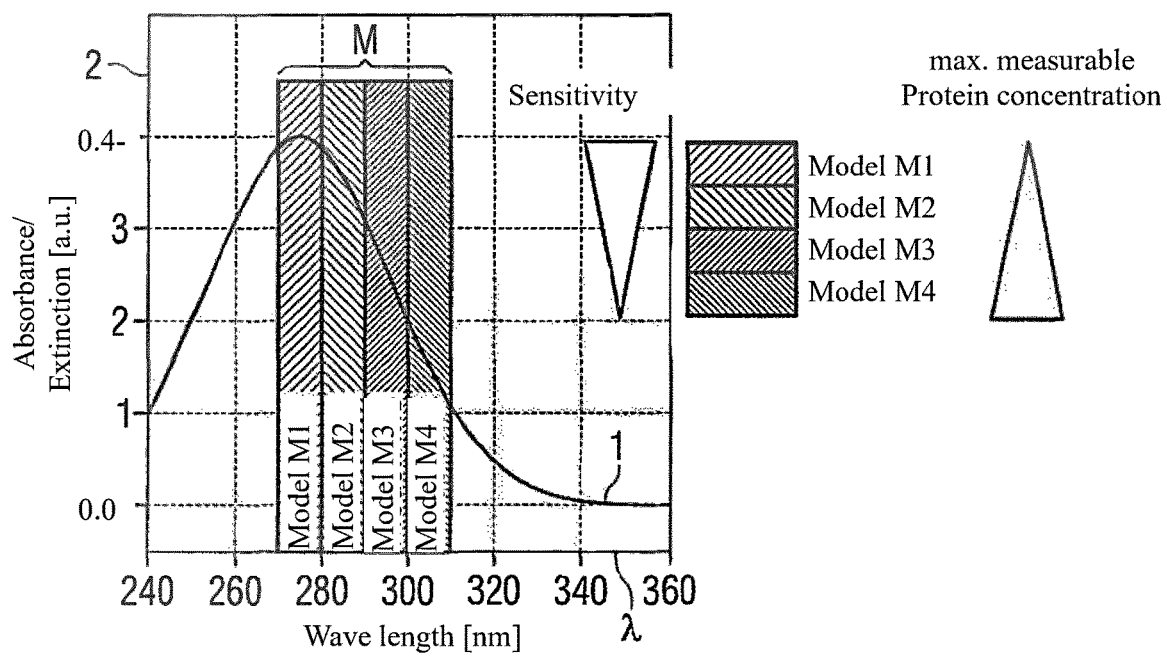
FIG. 2 is a representation of an exemplary spectrum of a protein band with marked wavelength ranges for various models.

FIG. 2 is a representation of an exemplary spectrum of a protein band with marked wavelength ranges for various models. The absorbance 2 is applied against the wavelength λ between approximately 240 nm and approximately 360 nm, resulting in the spectrum 1, in particular the absorption spectrum, for a band that has its local maximum at approximately between 270 nm and 280 nm, and shows a flank falling to both sides. The absorption band is caused by an exemplary protein.

The invention is based on measuring or detecting absorption spectrums in lieu of individual wavelengths and/or wavelength ranges. During the measurement, a medium is located in a measurement cell, for example in a flow cell that has a substantially constant thickness between approximately 100 nm and approximately 10 cm, in particular between approximately 500 nm and approximately 5 mm, and particularly preferably between approximately 800 nm and approximately 3 mm, for example of approximately 1 mm.

Depending on the concentration range to be measured, various multivariate models are generated that are based on the analysis of various wavelength ranges. The related models can for example be based on PLS, wherein the concentration of a predetermined protein is specified as the target variable, and the absorption values of the respective spectral range are used as input variables.

The wavelength ranges can either be selected manually by the user and/or be determined by an algorithm, and/or can be assigned different weight factors. All selected wavelength ranges are in this case be influenced by the absorbance of the target analyte (e.g. DNA or protein), by the preferably linear range of the detector response, or by the change of the matrix, for example by particle scatter or changes of the buffer composition.

FIG. 2 indicates individual wavelength ranges that are each mapped to a model M1, M2, M3, M4. For example, the wavelength range that is mapped to the model M1 is approximately between 270 nm and 280 nm. The wavelength range that is mapped to the model M2 is approximately between 280 nm and 290 nm. The wavelength range that is mapped to the model M3 is approximately between 290 nm and 300 nm, and the wavelength range mapped to the model M4 is approximately between 300 nm and 310 nm.

The individual wavelength ranges have different sensitivities with respect to the detection of the analyte concentration or the concentration of the substance in question. For example, the model 1, which is mapped to the wavelength range that falls into the maximum of the absorption band, has a particularly high sensitivity compared to the other models. The models that are mapped to the wavelength ranges that substantially lie in the flank of the absorption band show a declining sensitivity in comparison to each other from model 2 toward model 4, respectively. In other words, the segmentation of the models shown here demonstrates that the sensitivity declines with increasing wavelength. The dynamic range then changes depending on what model M1, M2, M3, M4 was selected. This applies similarly to the achievable analytical accuracy of the measurement.

Compared to the trend of the sensitivity, the exact inverse applies to the measurable absolute concentration of a substance. Model 1, which is mapped to the wavelength range into which the maximum of the absorption band falls, exhibits a low potential for detecting high concentrations. However, in the present case, this potential increases with increasing wavelength. The models mapped to wavelengths on the edge of the flank of the band exhibit a particularly pronounced ability to indicate high concentrations.

When the model is based on the wavelength with the highest absorbance or the maximum of a band, this model has the highest sensitivity, but the upper detection limit is already very quickly reached at low substance concentrations. Model M4, by contrast is predominantly based on wavelength ranges that lie in the flank of the band. The resulting sensitivity is lower, but far higher substance concentrations can be measured in exchange. In particular, the maximum of an absorption band already reaches very high values at relatively low concentrations due to the high sensitivity, and said high values in particular exceed the dynamic range of a sensor or detector.

In other words, the individual wavelength ranges exhibit different sensitivities with respect to the detection of analyte concentrations. The dynamic range then changes by model, and the same applies to the achievable analytical accuracy of the measurement. FIG. 2 illustrates this. It shows an example of an absorption band of a protein or of a protein species. When the model is at its core based on the wavelength with the highest absorbance, this model has the highest sensitivity, but the upper detection limit is already very quickly reached at low protein concentrations. Model 4 is by contrast predominantly based on wavelength ranges that lie in the flank of the band. The resulting sensitivity is lower, but far higher protein concentrations can be measured in exchange.

Figure 4:
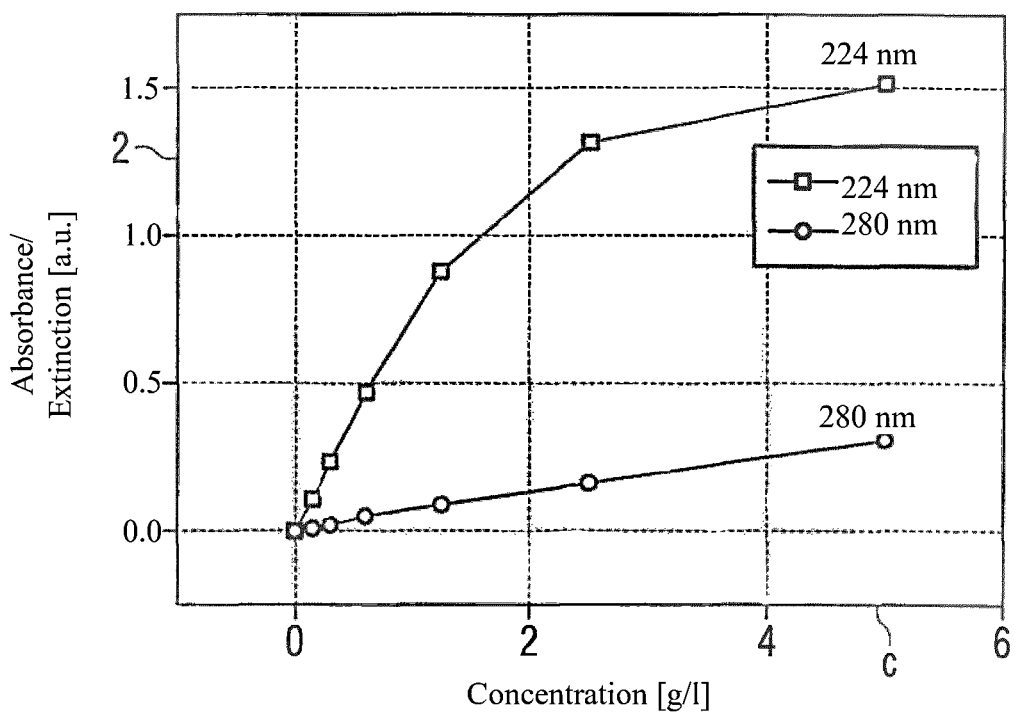
FIG. 4 is a representation of an exemplary assignment of absorption values of various concentration samples versus the corresponding concentration at two different excitation wavelengths.

This is also illustrated by the different linear ranges of the various models. FIG. 4 shows of the absorbance or absorption of two protein bands at different concentrations. The band at 224 nm exhibits far greater changes with increasing protein concentration than the 280 nm band (and therefore has higher sensitivity). The linear range for the 280 nm band is far greater in exchange.

Figure 3:
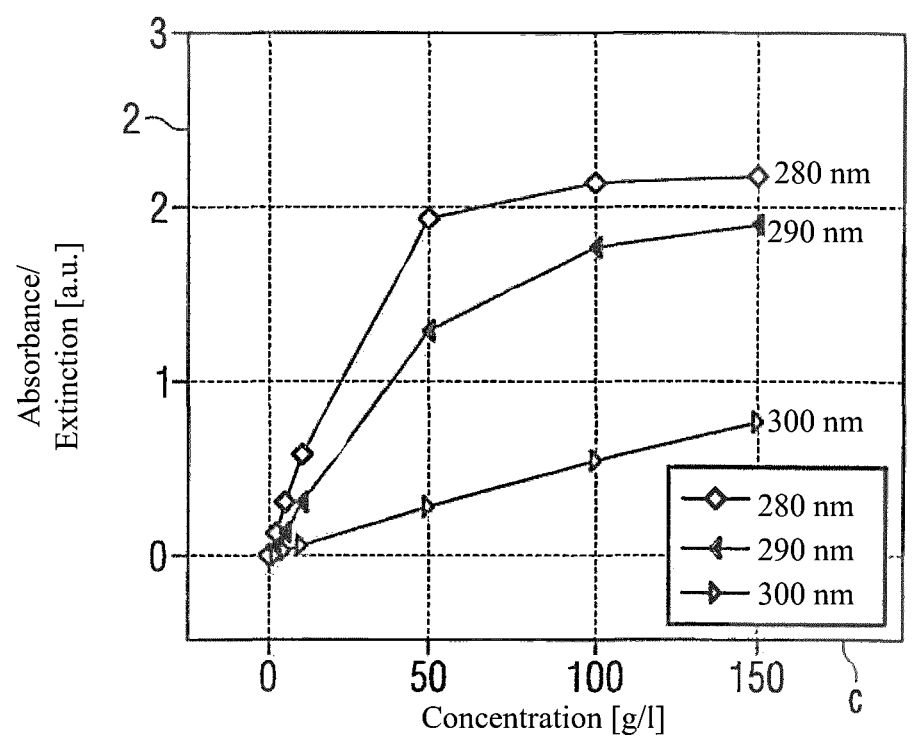
FIG. 3 is a representation of an exemplary assignment of absorption values of the exemplary protein bands shown in FIG. 2, accordingly of various concentration samples versus the corresponding concentration at three different excitation wavelengths.

FIG. 3 shows how the absorbance of the model behaves based on various wavelength ranges of a single band at changing protein concentrations.

The dependency described above is described as a function of concentration in the following figures FIG. 3 and FIG. 4 based on the respective applications of the absorption values 2 at respectively specified wavelength λ.

FIG. 3 is a representation of the application of absorption values 2 of the protein bands shown in FIG. 2, accordingly for respectively different concentrations c at three different excitation wavelengths. However, the protein band shown in FIG. 2 only corresponds to a single selected concentration. In other words, the absorption 2 is applied versus the substance concentration c for various wavelength ranges of the protein band with the maximum at approximately 280 nm. FIG. 3 in particular shows how the absorbance 2 of three models behaves based on various wavelength ranges of a single band at changing protein concentrations c.

The three models selected as examples for FIG. 3 are mapped to wavelength ranges that each comprise the value of approximately 300 nm, 290 nm and 280 nm. The recorded adjacent data points of a model were each connected with a linear connection line. Models in ranges that exhibit substantially linear dependencies between absorbance 2 and concentration c are in particular suited for reliably projecting undetermined concentrations. As is evident from the representation in FIG. 3, the wavelength ranges or the models have different, substantially linear, ranges.

The application for approximately 300 nm for example has a linear range over a particularly wide concentration c, that is to say between approximately 0 g/l and 150 g/l. The entire range can be relied upon for projecting an undetermined concentration, even though the sensitivity of this wavelength versus the concentration c is not high compared to the other models. The application for approximately 290 nm shows a high sensitivity compared to the application for approximately 300 nm. However, the linear range within which reliable projections can be made already ends for values starting from approximately 50 g/l. The application for 280 nm shows a comparatively high sensitivity versus changes in the concentration, but only the concentration range below approximately 10 g/l is linear. With respect to the spectrum shown in FIG. 2, the value of approximately 280 nm lies relatively close to the maximum, whereas the other two values of approximately 290 nm and 300 nm lie in the area of the falling flank of spectrum 1.

In other words, linear ranges of different size can be relied upon for analysis depending on what model was selected. The three shown models have different sensitivities, in particular at low substance concentrations. The model for 280 nm shows the highest sensitivity and therefore also the highest measurement accuracies at low substance concentrations; in exchange, the model at 300 nm has a far greater linear range up to 150 g/L of protein. Based on this approach, it is possible to meet the needs of various applications, for example monitoring a DNA concentration and/or the concentration of various proteins, wherein the hardware configuration can be left unchanged, and in particular no variation of the optical path length is required.

FIG. 4 is a representation of the application of absorption values of two exemplary bands at two different excitation wavelengths for different concentrations. In other words, FIG. 4 shows the respective absorbance of two protein bands at different concentrations. The band at 224 nm exhibits far greater changes with increasing substance concentration than the 280 nm band, and therefore a higher sensitivity. The linear range for the band at 280 nm is far greater in exchange.

Figure 5:
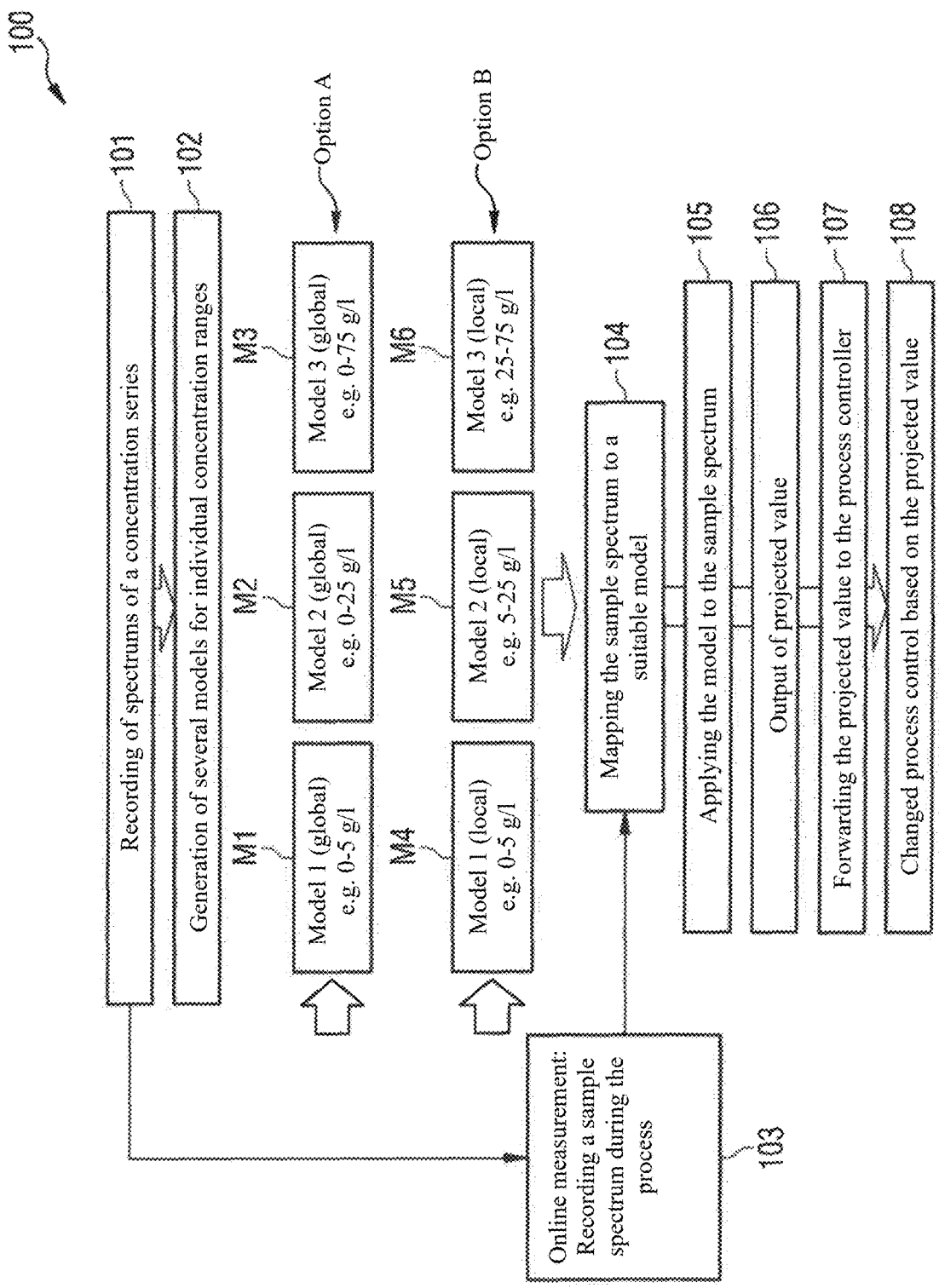
FIG. 5 is a schematic representation of an exemplary method for open-loop or closed-loop process control.

FIG. 5 is a schematic representation of an exemplary method 100 for open-loop or closed-loop process control. The method begins with step 101 which is intended to determine a plurality of spectrums of a concentration series of a certain substance, whose concentration in a medium or in a sample is to be determined. The protein to be separated can for example be a photosynthesis protein. A dilution series can for example comprise staggered concentration ranges. The concentrations of a substance for predetermined ranges can in particular lie at constant spacing, wherein the constant spacing can be enlarged and/or reduced by ranges. Additionally or alternatively, the spacing can for at least one range also be selected to be non-constant. Such an example of a concentration series is stated as follows: 100 mg/l; 400 mg/l; 700 mg/l; 1 g/l; 1.5 g/l; 2 g/l; 2.5 g/l; 5 g/l; 7.5 g/l; 10 g/l; 20 g/l; 30 g/l; 40 g/l; 50 g/l; 75 g/l; 100 g/l; 150 g/l etc.

The concentration series preferably only comprises the substance to be determined at different concentrations, dissolved in a suitable, substantially physiological solvent, in particular in an aqueous buffer solution, for example in a phosphate-buffered salt solution or a TBS buffer. The solution can in a specific case also comprise a detergent and/or an additive of another substance to prevent a potential denaturing of the substance.

In particular a measurement cell with a constant gap width or sample layer thickness is used for recording the spectrums of the concentration series. Alternatively, two optical light conductors with a constant spacing at least partially within a container, in which the medium is at least partially present, can be arranged, wherein one light conductor is formed to emit light or electromagnetic radiation into the medium, and the other light conductor is formed to at least partially collect the transmitted radiation and to forward said radiation to an analysis unit and/or the UV/vis spectrometer.

For each concentration sample of the concentration series, at least one spectrum is respectively detected, in particular in a range between approximately 200 nm and 700 nm.

Based on the spectrums of the concentration serious at which absorption values are typically applied versus the wavelength, suitable models for various concentration ranges are generated in step 102. In particular, multivariate models are generated, preferably using partial least square (PLS) regression, orthogonal PLS (OPLS) regression, and comparable regression concepts.

In particular, hierarchical models can be selected, wherein each model covers a certain concentration range. Hierarchical models are governed by the rule that the accuracy for lower concentrations is high and declines at higher concentrations, and that model errors can as a result occur.

Method 100 supplies two combinable options, that is to say option A, a global model, and option B, a local model. The global model of option A comprises the exemplary submodels, that is to say models M1, M2 and M3, each based on spectrums measured for example between approximately 0 g/l and 5 g/l, between approximately 0 g/l and 25 g/l and between approximately 0 g/l and 75 g/l. A local model can additionally or alternatively also be applied. The local model of option B comprises the exemplary submodels, that is to say models M4, M5 and M6, each based on spectrums measured for example between approximately 0 g/l and 5 g/l, between approximately 5 g/l and 25 g/l and between approximately 25 g/l and 75 g/l. The significant difference between option A and option B is that the models M4, M5, and M6 for option B do not all begin at approximately 0 g/L, but only the first model M4.

Optionally, a hierarchical model can be selected that comprises a global model (Option A) over an entire concentration range (for example between approximately 0 g/l and 75 g/l) and represents an uppermost hierarchy, and further submodels M4, M5, M6 (Option B) for individual concentration ranges (for example staggered between approximately 0 g/l and 75 g/l).

Submodels are each generally based on non-saturated spectrums or spectrum ranges that are for example determined using an OPLS/PLS algorithm and/or by applying the absorbance versus the concentration of the relevant wavelength. In other words, the intent of the model in particular is to be based on unsaturated spectral ranges. This applies to the global model and likewise to the submodels. The linear range of each application is in particular determined in reference to each selected wavelength, followed by a decision whether the selected wavelength of a model can be used for a certain concentration range. In the linear range, the slope of the detector signal is generally at a maximum on concentration changes. Above the linear range, the slope successively declines until there are substantially no changes of the detector signal on further concentration increases. The nonlinear range can be analyzed further, but the projection accuracy is lower in this range, and the model complexity is higher, for example due to additional main components. Standard MVDA methods generally represent multi-linear methods, and these nonlinearities or nonlinear ranges can as a result not be optimally modeled. As a result, in particular linear regions of the application are suited for determining an undetermined concentration of a substance.

A dataset for modeling comprises a plurality of spectrums of samples with known analyte content (such as protein). Input variables include a plurality of intensities at various wavelengths (X values) and reference values such as the protein content or concentration (Y values). The algorithm finds correlations in the multivariate space of the X values that match the graph of the Y values. Reference is in particular made to the subject matter volume "Multi- and Megavariate Data Analysis—Basic principles and Applications" ($3^{rd}$ Edition) by L. Eriksson et al., which (in particular in Chapter 4) contains a detailed introduction to modeling, in particular using PLS.

The subsequent step 103 records an online measurement or a real-time measurement of at least one sample spectrum of a sample or a medium, which in particular comprises the substance to be determined. The term online measurement or real-time measurement refers to the fact that the medium or the sample is examined immediately upstream and/or downstream of, and/or during a process such that dynamic or immediate influence can be exerted on one or several process parameters on the basis of the determined concentration of the sub stance.

In step 104, the sample spectrum that was recorded in step 103 is classified into, or mapped to, at least one suitable model. Possible classification methods comprise for example PLS-DA (Partial Least Squares Discriminant Analysis), SIMCA modeling (Soft Independent Modeling of Class Analogy) of the Euclidean distances or a dendrogram. The sample spectrum is compared to the spectrum sets of the individual models, followed by classification based on best fit or based on the best fit results. In other words, in particular at least one, but preferably more, absorption values of a sample spectrum are compared to the corresponding absorption values of the spectrums of various models.

Additionally or alternatively, the classification can also be based on process knowledge or known process parameters, such as on known concentration ranges of the process step.

The sample spectrum is in particular based on a measurement, in particular on an online measurement during the process. An optimally used model can in particular be selected. A criterion can for example be the expected concentration of the sample. Based on the process, the user can then relatively roughly classify whether the concentration of the sample for example lies at approximately 15 g/L or at approximately 150 g/L; however, a precise classification can only be made based on the correspondingly selected model. Without an applicable model, it may then not be possible to estimate whether the concentration lies at approximately 12 g/l, 15 g/l or 17 g/l. A suitable model would for example be a model between 5 and 20 g/l.

In step 105, the model is applied against the sample spectrum in order to substantially at least approximately determine or project the unknown concentration in substance. Subsequently, the projected value or the determined concentration of the substance is then output by the computing unit in step 106, and forwarded or sent to the process controller in step 107. Based on the determined concentration value, the process controller to which this value was forwarded can then in step 108 exert the desired influence on the process. The process can then be controlled by open-loop and/or closed-loop control based on a determined projected value.

In other words, step 104 maps a current spectrum or a sample spectrum to a matching model. By employing the selected model, the current concentration or concentration of the substance to be determined is determined in step 105. In step 106, the determined value for the concentration of the substance is output to an interface, and is then forwarded to a controller in step 107. Based on the determined concentration value, the process controller that receives the projected value can then in step 108 exert the desired influence on the process, in particular on one or several process parameters.

The modeling, in particular the generation of several quantitative models based on the spectrums of the concentration samples, expressly differs from conventional calibration. A typical calibration can for example substantially be based on a linear regression between the wavelength and a protein concentration. A linear regression is substantially based on a fit or on a reconciliation calculation with a linear model. A calibration can also be based on nonlinear models. But the modeling described herein is in particular based on PLS models.

In particular PLS models ("Partial Least Squares") are based on the main components of two matrices X and Y. This involves calculating the main components for the respective matrices X and Y separately in order to generate a regression model between the loadings or scores of the main components (and not of the original data). The matrix X is for this purpose broken down into a matrix T (the "Score" matrix) and into a matrix P' (the "Loading" matrix) plus an error matrix E. The matrix Y is broken down into the matrices U and Q and the error term F. The two equations can be referred to as the "outer relationships". The objective of PLS is to minimize in particular the norm of F, while at the same time obtaining a correlation between X and Y in which the matrices U and T are set in relation to each other as follows: U=BT. This equation can also be referred to as the "inner relationship".

The controller can in particular comprise valves and pumps. Otherwise, the corresponding collected volume can be discarded, in particular if it exhibits contaminants. Additionally, using corresponding additives of substances, changes can be achieved for the pH value, conductivity, concentration, and/or other parameters, and these and/or other parameters can in particular be controlled by closed loop.

The term spectrum substantially refers to the absorption spectrum. But the term can also refer to an intensity spectrum when absorption spectroscopy is not affected. This is for example the case for Raman spectroscopy, which does not involve measuring absorbance of light but light with a "shifted" wavelength, triggered by the inelastic scatter of light on molecules. But without being limited to UV/vis spectroscopy, the present discussion substantially relates to the resulting absorption spectrums.

This document also primarily shows and discuses absorption bands of proteins. But the invention can also be based on all other substances, in particular molecules that can be examined with molecule spectroscopy.

The term "sample" is not limited to a random sample that can be examined ex-situ outside of a container, for example outside of a bioreactor. The term sample instead refers to a medium, in particular a fluid, a gas, a solid, and/or an arbitrary mixture thereof that comprises the substance, and is substantially located within the container during the measurement. The sample is in particular measured in-situ, that is to say substantially within the container in which the process is also performed. The sample is also in particular not discarded, but instead substantially remains with the entire medium in the container, and is exposed as needed to all further process steps. A sample is potentially not an identical medium. This means that the term sample refers to the medium that randomly enters the measurement cell, for example a flow cell, and is analyzed there. The molecules and/or atoms are not necessarily the same for each measurement of a continuous monitoring process, but the sample is instead for each measurement determined randomly. For measurements in containers, the sample is in particular representative for the bulk. For measurements in hoses, the sample is in particular representative for the volume in the corresponding hose area.

Host cell proteins (HCPs) can be process-induced contaminants used/expressed by the host cell to produce biopharmaceutical proteins. The host cell can either express HCP's, or it can itself consists of HCP's that are released on cell disruption or cell death. The majority of the HCPs are typically removed during the cleaning process (in particular >99%). But the remaining HCP quantities can potentially remain in the products, such as without limitation monoclonal antibodies (mAbs), antibody drug conjugates (ADCs), therapeutic proteins, vaccines, and other protein-based biopharmaceuticals.

A UV/vis spectrometer that is designed to substantially detect spectral information can have a broadband light source. On the other hand, a substantially broadband emission spectrum can also be generated by using several narrowband and/or broadband emitting light sources. A deuterium lamp ($D_2$ lamp) or a halogen lamp is an example for a substantially broadband emitting light source.

The term "narrowband" for the emission spectrum of an LED light source refers to light sources that emit electromagnetic radiation with a FWHM (spectral full width at half maximum) of values that are less than approximately 50 nm, in particular less than approximately 30 nm, and particularly preferably less than approximately 15 nm. For example, a light source with an FWHM of approximately 10 nm is a narrowband light source. One or several narrowband emitting light source(s) is/are frequently used to determine the extinction and correspondingly a concentration of a highly-specific substance that absorbs electromagnetic radiation at a highly-specific wavelength. An example for using several such light sources is based on two light sources each with an FWHM of approximately 10 nm that each have maximum emission values or peak wavelengths at approximately 250 nm and approximately 280 nm.

Corresponding to the selected light source and the corresponding emission spectrum regardless of narrowband or broadband emitting, the sensor can be selected in order to detect at least a portion of the emission spectrum. In other words, it is expedient that the emission spectrum of the light source overlaps with the sensitive range of the sensor, in particular at more than approximately 50%, and preferably at more than approximately 70%.

Sensors can also in particular have sensor elements with varying sensitive wavelength ranges that are designed to detect electromagnetic radiation in wavelength ranges not identical to each other.

The light source or light sources, regardless of narrowband or broadband emitting, is/are preferably designed to permit electromagnetic radiation in a wavelength range that is visible for humans, that is to say between approximately 380 nm and approximately 780 nm and lies in the UV range, that is to say between approximately 10 nm and approximately 380 nm.

Alternatively or additionally, the light source can be designed to emit electromagnetic radiation in the infrared range, that is to say between approximately 780 nm and approximately 50 μm.

As already described, the sensor can be tuned for the emission range.

The following describes further embodiments in features in other words, wherein these features can in particular be combined with previously described features.

An exemplary method for open-loop or closed-loop process control can be executed as follows:

1. Detect UV-Vis spectra of a concentration series
2.
   a. Generate models based on various wavelength ranges; the highest concentration of a sample within a model is in this case determined by the maximum absorbance in the corresponding wavelength range (Model 1 with focus on 224 nm only contains the samples from 0-2 g/l, Model 5 with focus on 300 nm contains all samples between 0 and 200 g/l.
   b. Alternatively to 2a, various calibration data sets can initially also be generated from the concentration series. Various models can then be prepared from these using statistical methods (such as PLS). In this case, the algorithm will redetermine the wavelength ranges for each calibration data set (and will then for models with high protein concentrations predominantly select wavelengths in the flank of the protein band, and will also not use the band at 224 nm).
3. Online measurement during the process
4. Classify the online spectrum with the models and select the model with the best match. This can be accomplished by using algorithms such as PLS-DA or calculating the Euclidean or Mahalanobis Distance, or SIMCA.
5. Apply the model to the online spectrum
6. Alternatively to 4 and 5, the required measurement range is clearly determined for every unit operation. Based on this knowledge, the user can also select the valid model directly.

Figure 6:
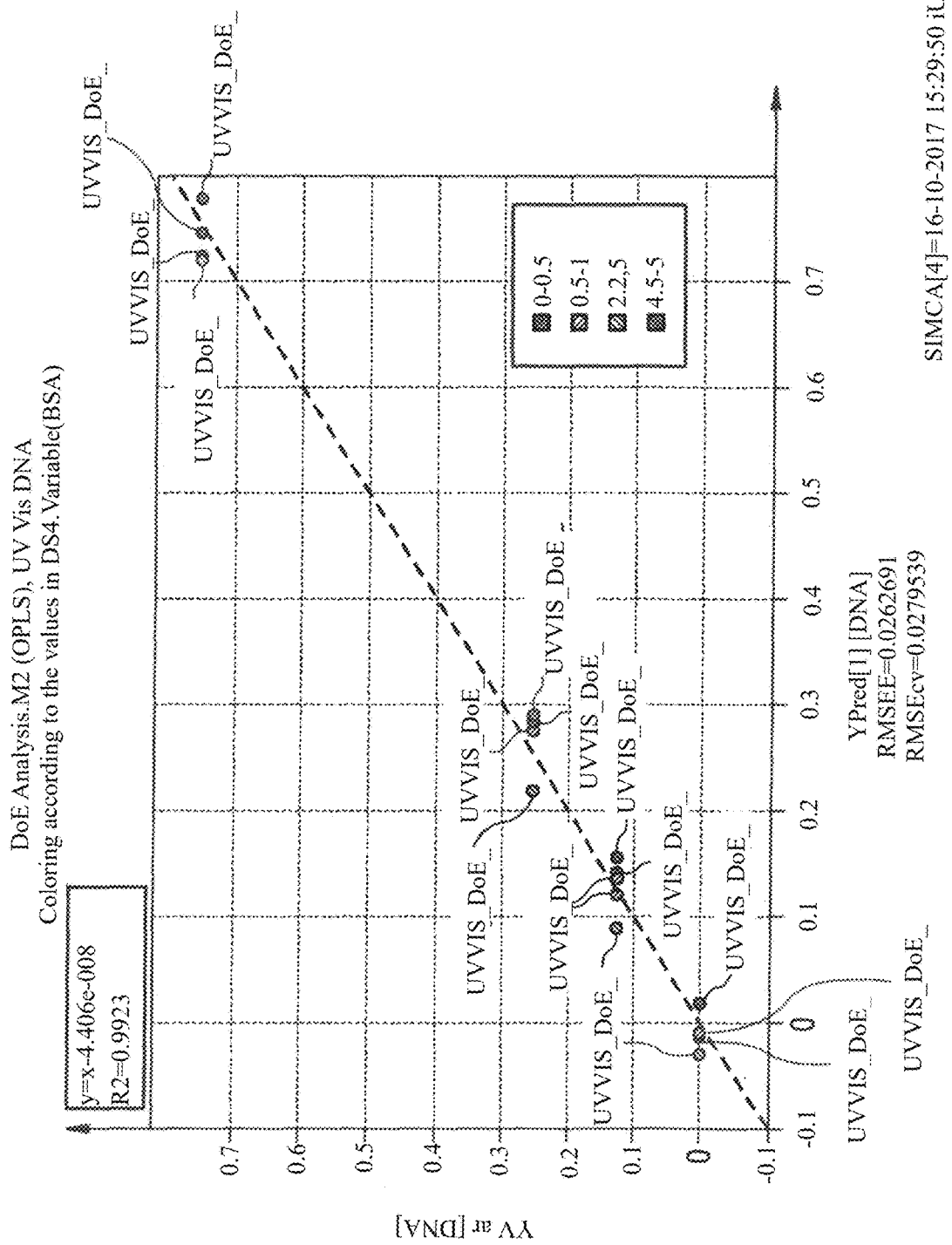
FIG. 6 shows the exemplary projection versus the reference value for DNA.

At the same time, recording the complete UV/vis spectrum also reduces or avoids cross sensitivity between DNA and protein, and it may be possible to detect HCP's and the target protein separately. FIG. 6 shows the projection versus the reference value for DNA at different protein concentrations. The coloration of the individual dots corresponds to the various protein concentrations in the sample. The model error is acceptable in spite of the greatly varying protein concentrations. The cross sensitivity is low.

In downstream processes, protein and DNA concentrations are generally important parameters that are repeatedly determined throughout the entire process chain. This determination is conventionally made off-line by measuring the UV-Vis absorbance by exciting individual wavelengths (for example with narrowband emitting LEDs).

Depending on the process step, protein concentrations can vary significantly (0-200 g/L); as a result samples can conventionally typically only be measured in various dilution stages. Due to the limited dynamic range (range within which substantially no saturation occurs) of detectors, available online sensors permit a determination of protein concentrations of up to approximately 10 g/L. This involves changing the optical path length depending on the concentration range in order to expand the detection range as needed. As a result, the same hardware cannot be used for all applications. Furthermore, existing UV sensors exhibit significant cross sensitivity between DNA and protein. Increasing the DNA concentration therefore also results in higher measured protein concentration.

However, it is important to note that a sensor can also detect concentrations of approximately 50 g/L by conventional means when the path length is appropriately reduced. However, a decision must be made first whether a higher sensitivity and a limited concentration range or a wider concentration range and reduced sensitivity need to be achieved. This is then determined first by selecting the path length. By contrast, the method according to the invention has the advantage that a decision can be made after the fact without changing the hardware as to whether a high sensitivity or a higher concentration range, or higher concentrations generally, are to be measured.

As already mentioned above, there are conventional systems with online UV sensors that work with 1 or 2 individual wavelength ranges (Optek, Pendotech), but that are already saturated at relatively low protein concentrations and therefore have a low dynamic range (see "Classic UV meter maxed out" in FlowVPE.pptx). The absorbance wavelength of various proteins can vary. Existing systems generally do not adjust the excitation and/or detection wavelength to the protein currently to be measured, and/or the excitation wavelength must be defined first and cannot be changed on the spot with the software depending on the application. The protein can then potentially be randomly measured in the maximum of the absorption wavelength (highest sensitivity), but much more frequently it will be the case that the excitation radiation lies in the flank of the protein absorption (low sensitivity). For the same reason, host cell proteins (HCPs) are generally detected together with the target protein (cross sensitivity is nearly 100%). For conventional measurements, the detection of the entire spectrum can permit an analytical differentiation only when the absorption maximums and/or the bandwidth or band shapes of the HCP's differ from the target protein.

With respect to these circumstances, a fiber was previously alternatively also given a movable design for UV transmission measurements such that the path length can be reproducibly vary, and can also be selected far smaller than the minimum path length available on conventional UV sensors, such as 1 mm. This approach also permits recording protein concentrations above 100 g/L. But the spacing between the fibers must be reproducibly adjustable with high precision. Furthermore, due to the complex metrology arrangement, an implementation is only transferable for use in single-user systems within limits.

The method for open-loop or closed-loop process control described herein is in particular based on measuring complete absorption spectrums instead of individual wavelength ranges, preferably by using a flow cell with constant optical path. A preferred flow cell thickness or sample layer thickness is at approximately 1 mm. Depending on the concentration range to be measured, in particular various multivariate models (such as PLS with protein concentration as a target parameter, and the absorption values of the respective spectral range as input parameters) are generated that are based on analyzing various wavelength ranges.

These wavelength ranges can either be selected by the user directly or [ . . . ], wherein all selected wavelength ranges are influenced by the absorbance of the target analyte (DNA or protein).

The invention permits an accurate determination of concentrations for DNA and/or proteins. In particular, this involves detecting absorption spectrums (instead of values at discrete wavelengths) in a cell at a constant optical path lengths of for example approximately 1 mm. A dataset is in particular assembled into a concentration range and multivariate models are generated for the results within various wavelength ranges. Selected wavelength ranges exhibit different sensitivities to DNA and/or protein. Individual wavelength ranges have different sensitivities. The dynamic range differs.

In FIG. 2, Model 1 is for example mapped to the absorbance at highest sensitivity, wherein the dynamic range is limited accordingly. Model 4 is generated at a reduced sensitivity, but the usable concentration range can be expanded. The concentration values are determined by comparing the collected data with previously specified models.

This permits protein and DNA concentrations to be determined with particular ease in downstream processes, and permits detecting the concentration ranges of DNA and protein, which fluctuate significantly in practice. The invention also permits avoiding the typically required dilution of the samples when measuring with regard to the limited dynamic range of the sensor. The cross sensitivity between DNA and protein when measuring can also be reduced or avoided.

LIST OF REFERENCE SYMBOLS

1 Optical spectrum
$1_a$ Optical spectrum of sample during the process prior to cleaning
$1_b$ Optical spectrum of sample during the process after cleaning
2 Absorption value(s)
3 Process, for example a downstream process
4 UV/vis spectrometer
$5_a$ Medium or sample in the process prior to cleaning
$5_b$ Medium or sample in the process after cleaning
6 Cleaning unit
7 Measurement cell
8 Optical light conductor
9 Analysis/computing unit
$9_a$ Desktop or screen
100 Method according to an embodiment
101 Recording of spectrums of a concentration series
102 Generation of several models for individual concentration ranges
103 Online measurement: Recording a sample spectrum during the process
104 Mapping the sample spectrum to a suitable model
105 Applying the model to the sample spectrum
106 Output of projected value
107 Forwarding the projected value to the process controller
108 Changed process control based on the projected value
λ Wavelength
$M_{1-6}$ Models

The invention claimed is:

1. A method for open-loop or closed-loop control of a process based on a projection of an unknown concentration of one or several substances in a test sample using spectroscopy the method comprising the steps:
detecting reference spectrums from a plurality of concentration samples, wherein each concentration sample contains a known concentration of the one or several substances, and wherein at least two of the concentration samples have different known concentrations from each other;
generating a plurality of quantitative models on the basis of the reference spectrums of the concentration samples, wherein each quantitative model maps to at least one spectral measurand of the reference spectrums to concentrations in a respective concentration range, wherein the concentration ranges for at least two of the quantitative models are not identical;
detecting a sample spectrum from the test sample containing the unknown concentration;
mapping the sample spectrum to at least one quantitative model from the plurality of quantitative models;
applying the at least one mapped quantitative model to the sample spectrum to determine a projected value for the undetermined concentration;
operating the process by open-loop and/or closed-loop control for at least one parameter based on the projected value for the undetermined concentration; and
wherein a higher weight factor for application on the sample spectrum is assigned to at least one partial range that exhibits a linear dependency between wavelengths and measurands, wherein the weight factor is applied manually or by an algorithm.

2. The method according to claim 1, wherein the reference spectrums comprise a unique mapping of the spectral measurand to several wavelengths, and wherein at least one subset of the spectral measurand that is mapped to the corresponding wavelengths does not exhibit a detector-side saturation.

3. The method according to claim 1, wherein the quantitative models comprise at least one global model.

4. The method according to claim 1, wherein the quantitative models comprise models organized hierarchically according to at least a first hierarchy level and a second hierarchy level, wherein in particular the first hierarchy level comprises a global model and the second hierarchy level comprises at least one local model.

5. The method according to claim 1, wherein the sample spectrum is mapped to at least one quantitative model using the Euclidean distance and/or Mahalanobis and/or PLS-DA and/or SIMCA.

6. The method according to claim 1, wherein open-loop and/or closed-loop control occurs for the at least one parameter, and the parameter comprises at least one of the following parameters: a valve circuit, a pump controller, a medium flow, a medium pressure, a gas pressure, a pH value, a filtration step, a fractioning step, a time controller, a process time setting, a temperature, an ion concentration, a chromatography step.

7. The method according to claim 1, wherein the at least one sample spectrum of the test sample is detected in line or online, and the open-loop and/or closed-loop control is preferably also performed during the process as a direct consequence of the determined projected value for the undetermined concentration.

8. The method according to claim 1, wherein the quantitative models are generated using multivariate model generation, in particular using multivariate regression, such as preferably using MLR, and/or PLS and/or OPLS.

9. The method according to claim 1, wherein at least a partial range or individual wavelengths of the reference spectrums from the plurality of the concentration samples are weakened or ruled out by applying a weight factor.

10. The method according to claim 1, wherein a plurality of sample measurands are recorded with a single, substantially identical, gap width of one or several measuring cell.

11. A device for open-loop or closed-loop process control based on the projection of an unknown concentration of at least one substance in a test sample using spectroscopy, comprising:
a spectrometer comprising an interface configured to receive reference spectrums of a plurality of concentration samples of the at least one substance and of at least one sample spectrum of the test sample, wherein each concentration sample contains a known concentration of the at least one substance;

A processor configured to:
generate a plurality of quantitative models based on the reference spectrums of the concentration samples, wherein each quantitative model maps at least one spectral measurand of the reference spectrums to concentrations within a respective concentration range, and wherein the concentration ranges for at least two of the quantitative models are not identical,
map the sample spectrum to at least one quantitative model of the generated quantitative models; and
apply the at least one quantitative model to the sample spectrum to determine a projected value for the undetermined concentration;

at least one process control system comprising valves, pumps, or both configured to operate the process by open-loop and/or closed-loop control for at least one parameter based on the projected value for the unknown concentration; and wherein the processor is further configured to assign a higher weight factor to at least one partial range that exhibits a linear dependency between wavelengths and measurands when applying the at least one mapped quantitative model to the sample spectrum, and wherein the weight factor is applied manually or by an algorithm.

12. The device according to claim 11, wherein the spectrometer comprises: a light source configured to emit electromagnetic radiation in a wavelength range between 200 nm and 700 nm; and a detector configured to detect the electromagnetic radiation after interaction with the test sample and the plurality of calibration samples also preferably comprises a spectrometer for detecting the spectrums of the plurality of concentration samples of the at least one substance and/or the at least one sample spectrum of the sample.

13. The device according to claim 12, further comprising a measuring cell, in particular a single use measuring cell that is designed to record and to conduct the sample with the substance, and on which the at least one sample spectrum can be detected.

14. A non-transitory computer readable medium containing program instructions stored thereon that, when executed by a computer, cause the computer to:
detect reference spectrums from a plurality of concentration samples, wherein each concentration sample contains a known concentration of the one or several substances, and wherein at least two of the concentration samples have different known concentrations from each other;
generate a plurality of quantitative models on the basis of the reference spectrums of the concentration samples, wherein each quantitative model maps to at least one spectral measurand of the reference spectrums to concentrations in a respective concentration range, wherein the concentration ranges for at least two of the quantitative models are not identical;
detect a sample spectrum from the test sample containing the unknown concentration;
map the sample spectrum to at least one quantitative model from the plurality of quantitative models;
apply the at least one mapped quantitative model to the sample spectrum to determine a projected value for the undetermined concentration;
operate the process by open-loop and/or closed-loop control for at least one parameter based on the projected value for the undetermined concentration; and
wherein a higher weight factor for application on the sample spectrum is assigned to at least one partial range that exhibits a linear dependency between wavelengths and measurands, wherein the weight factor is applied manually or by an algorithm.

15. The computer readable medium according to claim 14, wherein the spectrums comprise a unique mapping of the spectral measurand to several wavelengths and at least one subset of the spectral measurand that is mapped to the corresponding wavelengths does not exhibit a detector-side saturation.

16. The computer readable medium according to claim 14, wherein the quantitative models comprise at least one global model.

17. The computer readable medium according to claim 14, wherein the quantitative models comprise models organized hierarchically according to at least a first hierarchy level and a second hierarchy level, wherein in particular the first hierarchy level comprises a global model and the second hierarchy level comprises at least one local model.

18. The computer readable medium according to claim 14, wherein the sample spectrum is mapped to at least one quantitative model using the Euclidean distance and/or Mahalanobis and/or PLS-DA and/or SIMCA.

19. The computer readable medium according to claim 14, wherein open-loop and/or closed-loop control occurs for the at least one parameter, and the parameter comprises at least one of the following parameters: a valve circuit, a pump controller, a medium flow, a medium pressure, a gas pressure, a pH value, a filtration step, a fractioning step, a time controller, a process time setting, a temperature, an ion concentration, a chromatography step.

* * * * *